(12) United States Patent
Yabuya et al.

(10) Patent No.: US 6,443,831 B2
(45) Date of Patent: Sep. 3, 2002

(54) TRANSFER REGISTER

(75) Inventors: Shigeru Yabuya; Akiyoshi Nagano; Akira Azumi; Kazumichi Shigeno, all of Aichi-ken; Hiromi Nagai, Nisshin; Haruki Nagasaka, Toyohashi; Tetsuya Tani, Nishio, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/794,217

(22) Filed: Feb. 28, 2001

(30) Foreign Application Priority Data

Mar. 31, 2000 (JP) .................... 2000-096729
Feb. 23, 2001 (JP) .................... 2001-047615

(51) Int. Cl.⁷ .................................. B60H 1/34
(52) U.S. Cl. ........................ 454/155; 454/143
(58) Field of Search ................. 454/143, 152, 454/153, 154, 155, 315, 319, 320

(56) References Cited

U.S. PATENT DOCUMENTS

| 2,780,983 A | * | 2/1957 | Roo ....................... 454/315 |
| 4,345,510 A | * | 8/1982 | Sterett ................... 454/155 |
| 4,669,370 A | * | 6/1987 | Hildebrand et al. ..... 454/155 |
| 5,186,387 A | * | 2/1993 | Doi et al. .............. 236/49.3 |
| 5,188,561 A | * | 2/1993 | Nissimoff et al. ....... 454/256 |
| 5,573,458 A | * | 11/1996 | Chu ...................... 454/202 |
| 5,741,179 A | * | 4/1998 | Sun et al. ............... 454/155 |
| 5,816,907 A | * | 10/1998 | Crockett ................ 454/155 |
| 5,873,778 A | * | 2/1999 | Badenhorst ............ 454/155 |
| 6,179,707 B1 | * | 1/2001 | Arold .................... 454/150 |

FOREIGN PATENT DOCUMENTS

| JP | 3-87155 | 9/1991 |
| JP | 05-050530 | 3/1993 |
| JP | 09-052251 | 2/1997 |
| JP | 09-175162 | 7/1997 |
| JP | 10-258633 | 9/1998 |

* cited by examiner

Primary Examiner—Harold Joyce
Assistant Examiner—Derek S. Boles
(74) Attorney, Agent, or Firm—Pillsbury Winthrop LLP

(57) ABSTRACT

A method includes molding a set of deflector plates in a first mold with a first material, removing the deflector plates from the mold, and placing the deflector plates in a second mold, molding a duct to the deflector plates in the second mold using a second material. The molding includes forming an engaging rim in the duct for connecting the duct to another duct, and removing the deflector plates and the duct from the second mold. The deflector plates pivot with respect to the duct when the molding of the duct is finished.

12 Claims, 8 Drawing Sheets

TRANSFER REGISTER

BACKGROUND OF THE INVENTION

The present invention relates to a transfer register that is located in an instrument panel of a vehicle such as an automobile, a vessel or an airplane and is connected to an air conditioner the vehicle.

Japanese Unexamined Utility Model Publication No. 3-87155 discloses a transfer register 100, which is illustrated in FIG. 10. The transfer register 100 includes a duct 101. Horizontal front deflector plates 102 are pivotally supported in the duct 101. The front deflector plates 102 are connected by a front connector rod 103, which is located at a side of the front deflector plates 102. The front connector rod 103 permits the front deflector plates 102 to pivot vertically in a synchronized manner.

Vertical rear deflector plates 104 are pivotally supported in the duct 101. The rear deflector plates 104 are connected by a rear connector rod 105. The rear connector rod 105 permits the rear deflector plates 104 to pivot horizontally in a synchronized manner.

A knob 106 is located on the center one of the front deflector plates 102. The knob 106 slides horizontally on the associated front deflector plate 102. One end of the knob 106 is coupled to the center one of the rear deflector plates 104. The one end moves along the associated plate 104. When the knob 106 is pivoted vertically, the front deflector plates 102 are synchronously pivoted by the front connector rod 103, which vertically changes the direction of air exiting the opening 101a of the duct. When the knob 106 is slid horizontally, the rear deflector plates 104 are synchronously pivoted by the rear connector rod 105, which horizontally changes the direction of the air exiting the opening 101a.

The duct 101, the front and rear deflector plates 102, 104, the front and rear connector rods 103, 105 and the knob 106 are separately formed with resin. When assembling the transfer register 100, the front deflector plates 102 are pivotally installed in the duct 101. Then, the front connector rod 103 is attached to the front deflector plates 102. Thereafter, the rear deflector plates 104 are installed in the duct 101, and the rear connector rod 105 is attached to the rear deflector plates 104. Subsequently, the knob 106 is attached to the center one of the front deflector plates 103. One end of the knob 106 is engaged with the center one of the rear deflector plates 104. The transfer register 100 has a relatively large number of parts and the assembly is complicated. Accordingly, the cost is relatively high and the manufacture is troublesome.

SUMMARY OF THE INVENTION

Accordingly, it is an objective of the present invention to provide a transfer register that reduces the number of parts and is easy to assemble.

To attain the above-mentioned object, the present invention provides a method including molding a set of deflector plates in a first mold with a first material, removing the deflector plates from the mold, placing the deflector plates in a second mold, molding a duct to the deflector plates in the second mold using a second material. The first material does not adhere to the second material. The molding includes forming an engaging rim in the duct for connecting the duct to another duct, and removing the deflector plates and the duct from the second mold. The deflector plates pivot with respect to the duct when the molding of the duct is finished.

The present invention also provides a register. The register has a first deflector plate and a second deflector plate. A first duct supports the first deflector plate such that the first deflector plate pivots with respect to the first duct about an axis. A second duct, which is separate from the first duct, supports the second deflector plate such that the second deflector plate pivots with respect to the second duct about an axis. The axis about which the first deflector plate pivots is perpendicular to the axis about which the second deflector plate pivots. The first duct is connected to the second duct such that the register is unitary.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 5.

Figure 1:
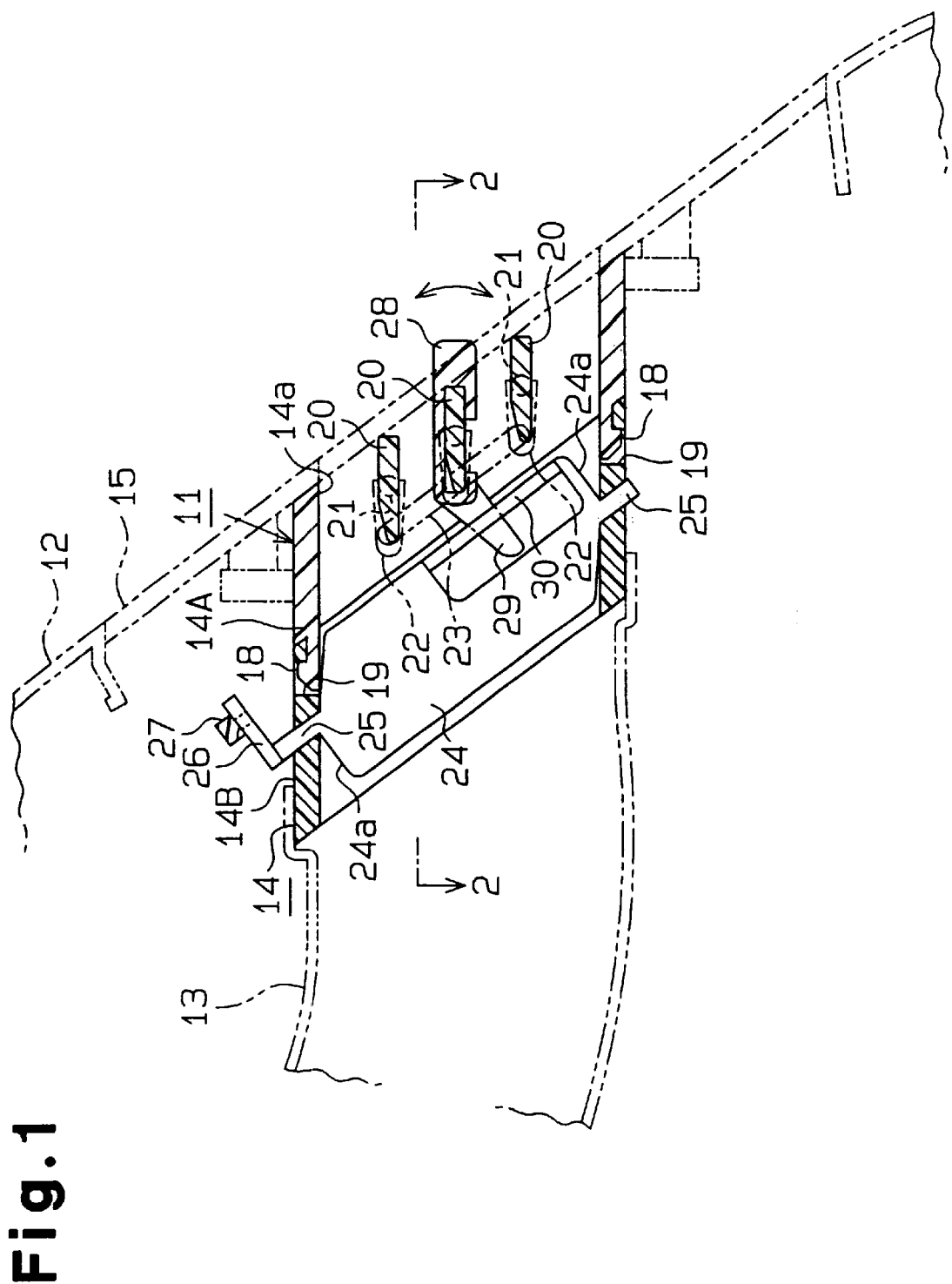
FIG. 1 is a cross-sectional view illustrating a transfer register according to a first embodiment of the present invention.

As shown in FIG. 1, the front end of a transfer register 11 is secured to an instrument panel 12 of an automobile. The rear end of the register 11 is coupled to an air pipe 13. The air pipe 13 is connected to an air conditioner. In FIG. 1, the right end of the register 11 is defined as the front end, and the left end of the register 11 is defined as the rear end. The register 11 includes an air duct 14 having a rectangular cross section. Air flows from the left to the right of the duct 14 as viewed in FIG. 1. An opening 14a of the duct 14 faces the interior of the passenger compartment of the automobile. The opening 14a is inclined relative to the upper and lower surfaces of the duct 14. A bezel 15 is attached to the opening 14a.

Figure 2:
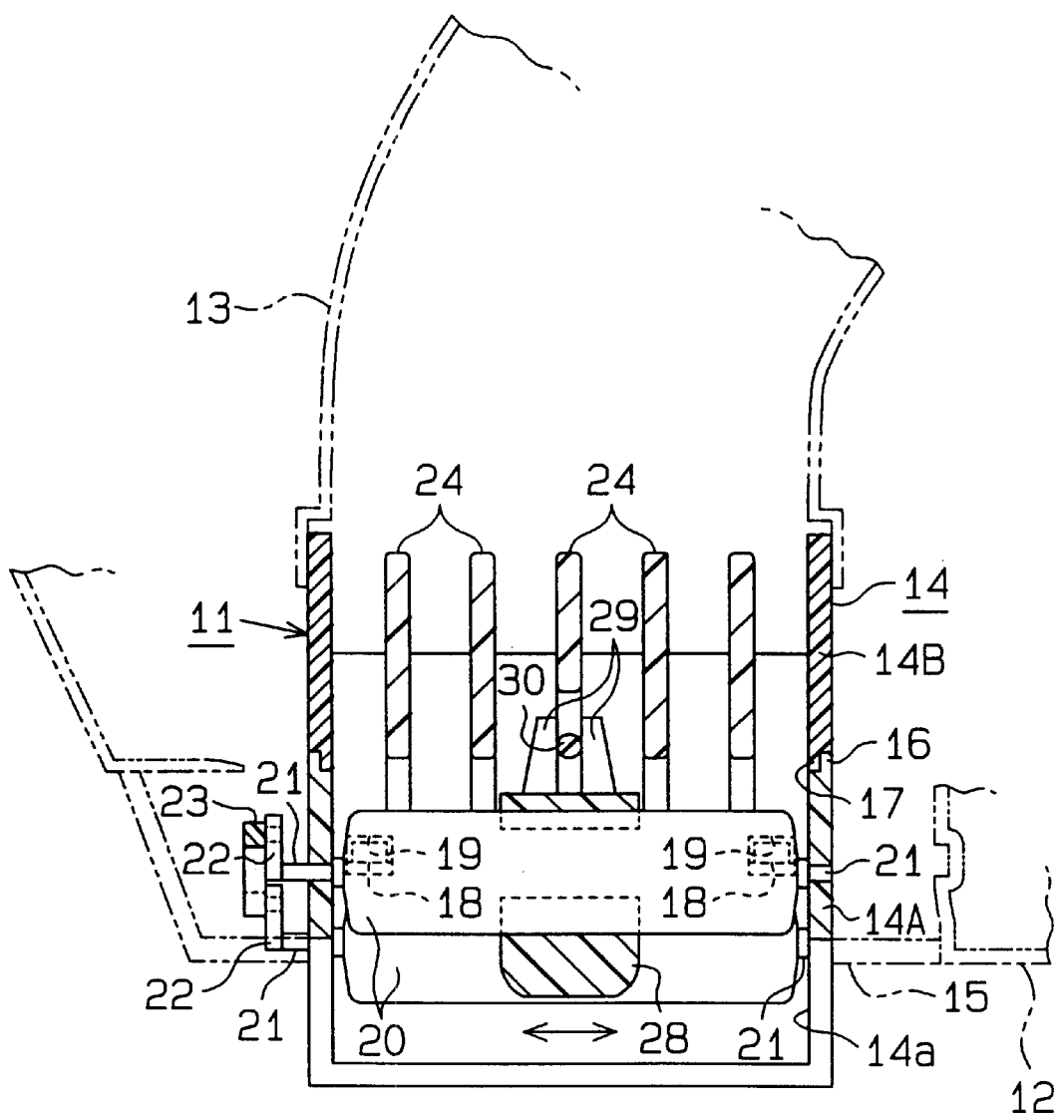
FIG. 2 is a cross-sectional view taken along line 2—2 of FIG. 1.

As shown in FIGS. 1 and 2, the duct 14 includes a front duct member 14A and a rear duct member 14B. The front duct member 14A and the rear duct member 14B have engaging rims 16, 17, respectively. The duct members 14A and 14B are coupled to each other by engaging the rims 16 and 17. A pair of hooks 18 are formed in the top and bottom sides of the rear end of the front duct member 14A. A pair of notches 19 are formed in the top and bottom sides of the front end of the rear duct member 14B. The front duct member 14A and the rear duct member 14B are secured to each other by engaging the hooks 18 with the notches 19.

Horizontal front deflector plates 20, the number of which is three in this embodiment, are located in the front duct member 14A at predetermined intervals along the opening 14a. Each front deflector plate 20 has a pair of front support shafts 21 each extending from one of the ends. Each front deflector plate 20 is pivotally supported by the front duct member 14A through the front support shafts 21. Front coupler levers 22, the number of which is three in this embodiment, are located outside of the front duct member 14A. Each front coupler lever 22 is connected to one of the front support shafts 21 of the corresponding front deflector plate 20. The distal ends of the front coupler levers 22 are connected by a connector, which is a front connector rod 23 in this embodiment. The front deflector plates 20 are pivoted synchronously by the front connector rod 23.

As shown in FIG. 2, rear deflector plates 24, the number of which is five in this embodiment, are arranged at equal intervals in the rear duct member 14B. The rear deflector plates 24 extend vertically and are located in the vicinity of the front deflector plates 20. The front edges of the rear deflector plates 20 are parallel to the opening 14a. As shown in FIG. 1, each rear deflector plate 24 has a pair of rear support shafts 25 each extending from one of the ends. Each rear deflector plate 24 is pivotally supported by the rear duct member 14B through the rear support shafts 25. Rear coupler levers 26, the number of which is five, are located outside the rear duct member 14B. Each rear coupler lever 26 extends from the upper rear support shaft 25 of one of the rear deflector plates 24. The distal ends of the rear coupler levers 26 are coupled to one another by a connector, which is a rear connector rod 27. The rear connector rod 27 permits the rear deflector plates 24 to pivot synchronously.

As described above, the plane of the opening 14a of the duct 14 is inclined relative to the upper and lower surfaces of the duct 14. Also, the axes of the rear deflector plates 24 are inclined and parallel to the plane of the opening 14a such that the rear deflector plates 24 are located close to the front deflector plates 20. Chamfers 24a are formed in the upper rear portion and the lower front portion of each rear deflector plate 24. The chamfers 24a prevent the upper and lower surfaces of the duct 14 from interfering with the rear deflector plates 24.

A knob 28 is coupled to the center one of the front deflector plates 20. The knob 28 is slid in the lateral direction along the associated front deflector plate 20. A pair of engaging projections 29 extends rearward from the knob 28. The center one of the rear deflector plates 24 has an engaging pin 30. The projections 29 engage the pin 30 and move along the associated rear deflector plate 24.

When the knob 28 is moved vertically, the front deflector plates 20 are synchronously pivoted through the front connector rod 23. Accordingly, the direction of air blown out of the opening 14a is vertically changed. When the knob 28 is moved horizontally, the rear deflector plates 24 are synchronously moved through the rear connector rod 27. Accordingly, the direction of air blown out of the opening 14a is changed horizontally.

The front deflector plates 20, the front support shafts 21, the front coupler levers 22, the front connector rod 23 and the front duct member 14A are formed in a single double molding process. The front deflector plates 20, the front support shafts 21, and the front coupler levers 22 are made of a thermoplastic resin having a relatively high melting point such as acrylonitrile butadiene styrene resin (ABS). The front duct member 14A and the front connector rod 23 are made of resin such as polypropylene (PP), the melting point of which is lower than that of the resin of the front deflector plates 20, the front support shafts 21 and the front coupler lever 22. The resin of the front duct member 14A and the front connector rod 23 does not adhere to the resin of the front deflector plates 20, the front support shafts 21 and the front coupler levers 22. As described above, double molding refers to a method for molding an article using two resins that have different melting points.

The rear deflector plates 24, the shafts 25, the rear coupler levers 26 and the rear connector rod 27, and the rear duct member 14B are formed in a single double molding process. The rear deflector plates 24, the rear support shafts 25, the rear coupler levers 26 are made of a thermoplastic resin having a relatively high melting point such as acrylonitrile butadiene styrene resin (ABS). The rear duct member 14B and the rear connector rod 27 are made of a resin such as polypropylene (PP), the melting point of which is lower than that of the resin of the rear deflector plates 24, the shafts 25 and the rear coupler levers 26. The resin of the rear duct member 14B and the rear connector rod 27 does not adhere to the resin of the rear deflector plates 24, the rear support shafts 25 and the rear coupler levers 26.

Figure 3:
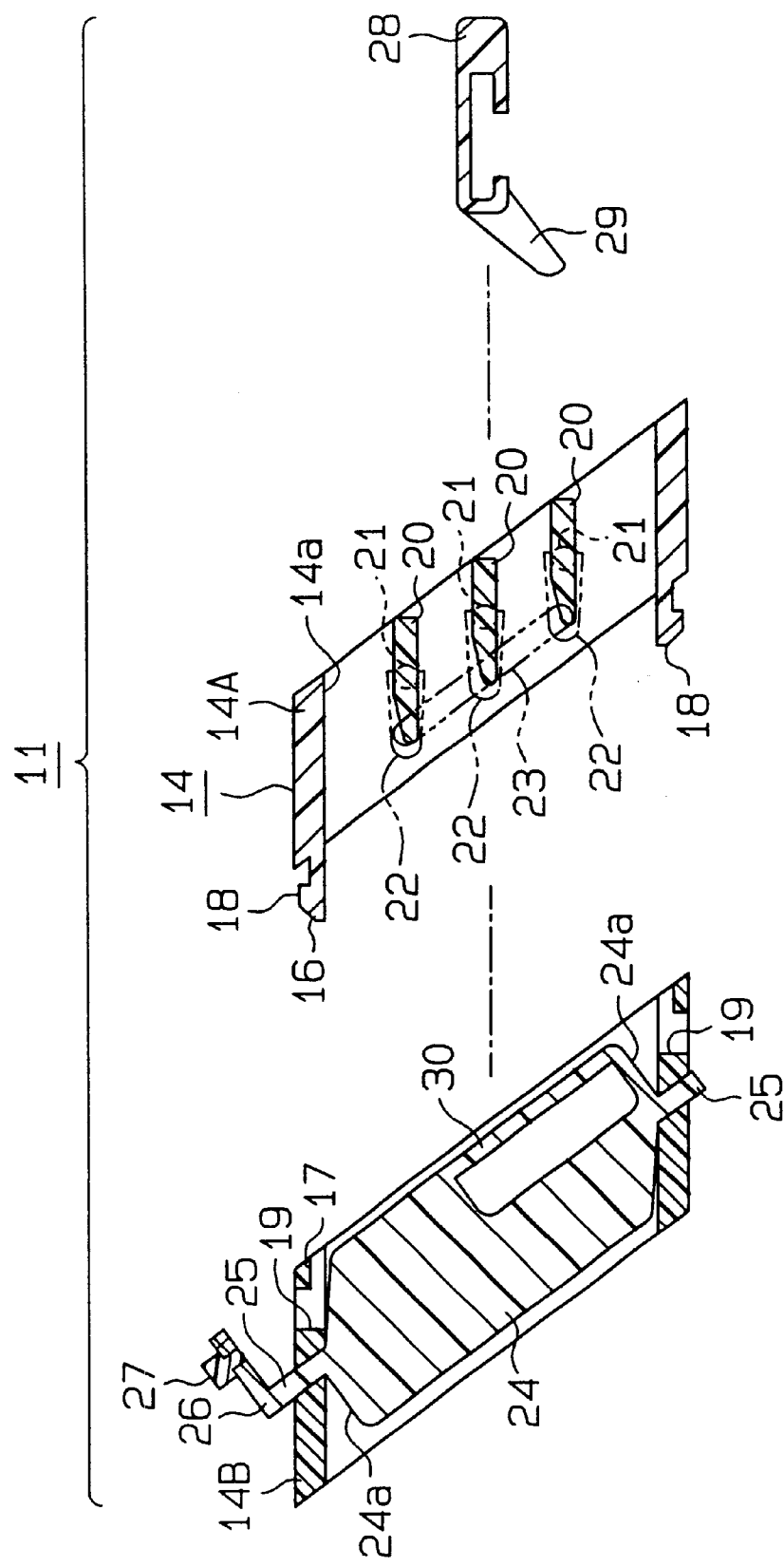
FIG. 3 is an exploded cross-sectional view of the transfer register shown in FIG. 1.

As shown in FIG. 3, the front duct member 14A, in which the front deflector plates 20 are formed, and the rear duct member 14B, in which the rear deflector plates 24 are formed, are engaged with each other through the engaging rims 16, 17. Thereafter, the knob 28, which is separately molded, is attached to the corresponding one of the front deflector plates 20.

A procedure for double molding the front duct member 14A will now be described with reference to FIGS. 4 and 5.

Figure 4:
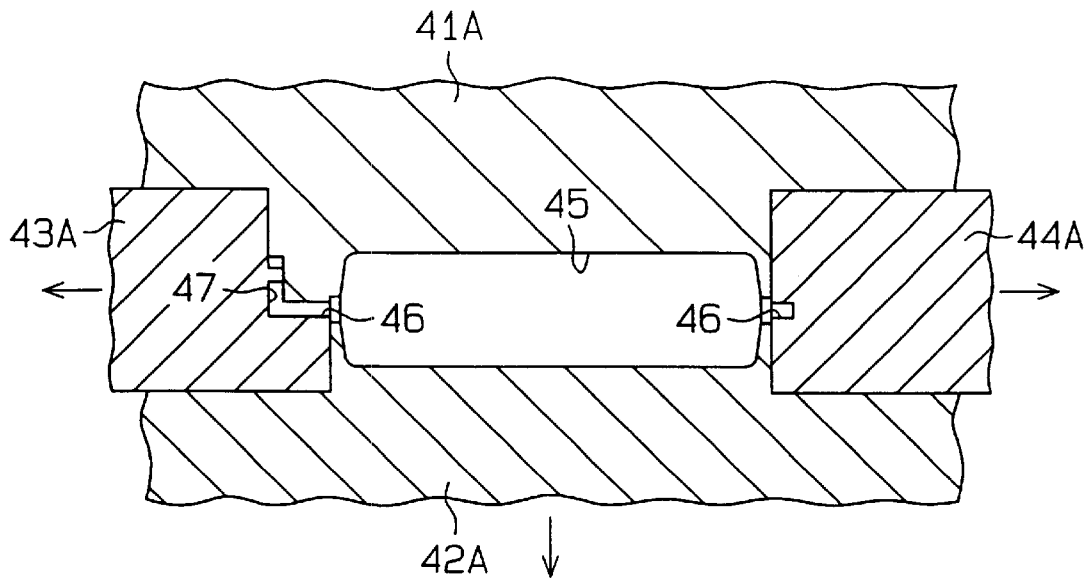
FIG. 4 is an enlarged partial cross-sectional view illustrating a first step for double molding a front duct member and front deflector plates of the transfer register shown in FIG. 1.

In a first step shown in FIG. 4, a first stationary die 41A, a first movable die 42A, a first left slide core 43A and a first right slide core 44A define front deflector plate cavities 45, front support shaft cavities 46 and front coupler lever cavities 47.

ABS, the melting point of which is two hundred and ten degrees centigrade, is injected into the cavities 45, 46, 47 from a gate (not shown). As a result, the front deflector plates 20, the front support shafts 21, the front coupler levers 22 are simultaneously formed. After the front deflector plates 20, front support shafts 21 and the front coupler levers 22 are cooled, the first movable die 42A and the slide cores 43A, 44A are moved outward. Then, the front deflector plates 20, front support shafts 21 and the front coupler levers 22 are removed from the dies 41A, 42A.

Figure 5:
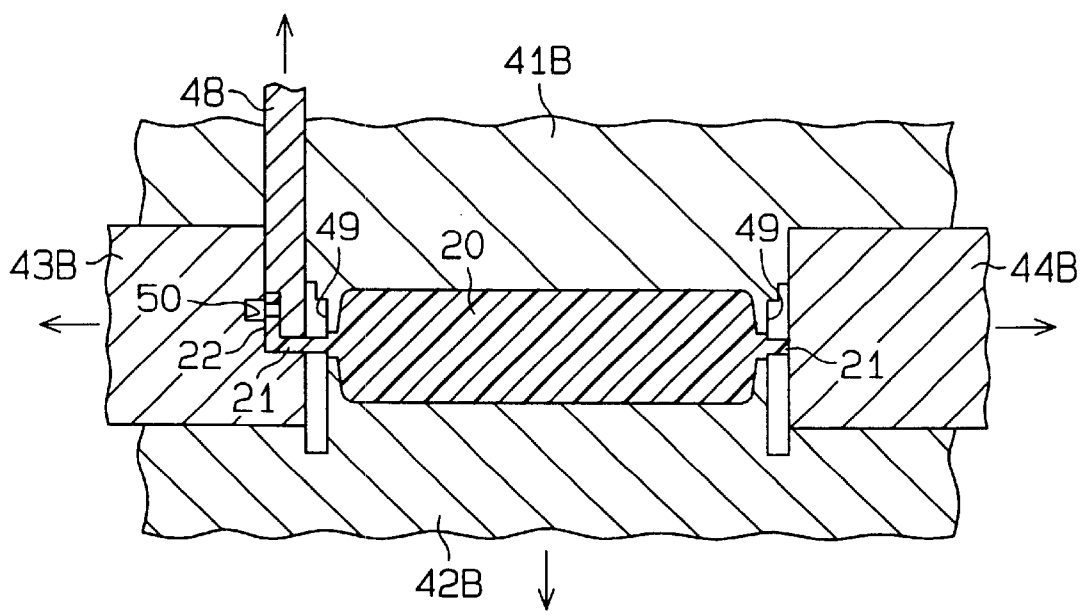
FIG. 5 is an enlarged partial cross-sectional view illustrating a second step, which is performed subsequent to the first step of FIG. 4.

In a second step, which is shown in FIG. 5, the front deflector plates 20, front support shafts 21 and the front coupler levers 22, which were molded in the first step, are inserted between a second stationary die 41B and a second movable die 42B. The front deflector plates 20, the second stationary die 41B, the second movable die 42B, a second left slide core 43B, a second right slide core 44B and an upper slide core 48 define a duct cavity 49 and a rod cavity 50. PP, the melting point of which is one hundred and seventy degrees centigrade, is injected into the cavities 49, 50 from a gate (not shown). The front duct member 14A and the front connector rod 23 are formed simultaneously. After the front duct member 14A and the front connector rod 23 are cooled, the second movable die 42B and the slide cores 43B, 44B 48 are moved outward. Then, the front duct member 14A and the front connector rod 23 are removed from the dies 41B, 42B.

In this manner, the front deflector plates 20, the front support shafts 21 and the front coupler levers 22 are molded with ABS, which has a relatively high melting point, in the first step. Thereafter, the front duct member 14A and the front connector rod 23 are molded with PP, which has a relatively low melting point, in the second step.

ABS and PP do not adhere to each other. Thus, in the second step, the parts formed in the first step do not stick to the parts formed in the second step. After the molding, the front deflector plates 20 are pivotal with respect to the front duct member 14A.

The front duct member 14A, which includes the front deflector plates 20, is easily formed by double molding. Also, the rear duct member 14B, which includes the rear deflector plates 24, is easily formed by double molding. The knob 28 is molded by another set of dies. The transfer register 11 is easily formed by assembling the front duct member 14A, the rear duct member 14B and the knob 28 as shown in FIG. 3.

The embodiment of FIGS. 1 to 5 has the following advantages.

a) The duct 14 is formed by assembling the front duct member 14A and the rear duct member 14B, which are separately formed. The front deflector plates 20, which are pivotable, are formed in the front duct member 14A through double molding. The rear deflector plates 24 are also formed in the rear duct member 14B through double molding. Then, the front duct member 14A and the rear duct member 14B are coupled to each other.

The front duct member 14A, which has the front deflector plates 20, is formed as a unit. The rear duct member 14B, which has the rear deflector plates 24, is formed as a unit. Compared to a case where the deflector plates 20, 24 are formed separately from the duct members 14A, 14B, the embodiment of FIGS. 1 to 5 has fewer units, which simplifies the assembly. As a result, the cost of the transfer register 11 is reduced.

b) The front and rear connector rods 23, 27, which are located outside the corresponding duct members 14A, 14B, are formed simultaneously with the duct members 14A, 14B with the same material as the duct members 14A, 14B.

Therefore, the front connector rod 23, the front duct member 14A and the front deflector plates 20 are formed as a unit. Also, the rear connector rod 27, the rear duct member 14B and the rear deflector plates 24 are formed as a unit. The number of parts that are separately formed is reduced, which simplifies molding and assembly of the transfer register 11.

The front and rear connector rods 23, 27 are located outside of the duct members 14A, 14B. That is, except for the knob 28, no parts that disturb the flow of air defined by the deflector plates 20, 24 exist in the duct members 14A, 14B. In other words, the direction of the air exiting the opening 14a is accurately adjusted by changing the angle of the deflector plates 20, 24.

A second embodiment of the present invention will now be described with reference to FIGS. 6 and 7. The differences from the embodiment of FIGS. 1 to 5 will mainly be discussed below.

Figure 7:
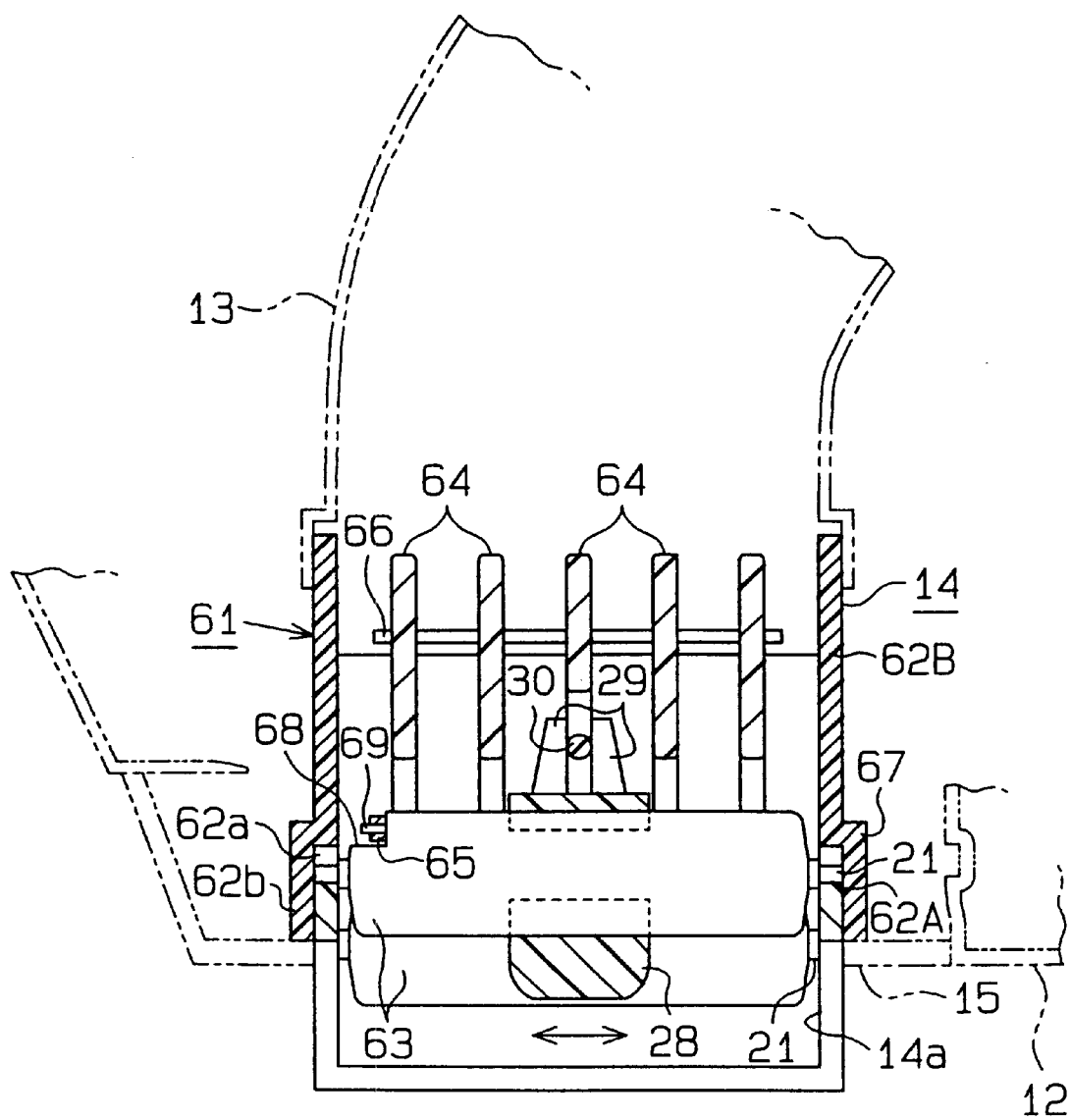
FIG. 7 is a cross-sectional view taken along line 7—7 of FIG. 6.
Figure 8:
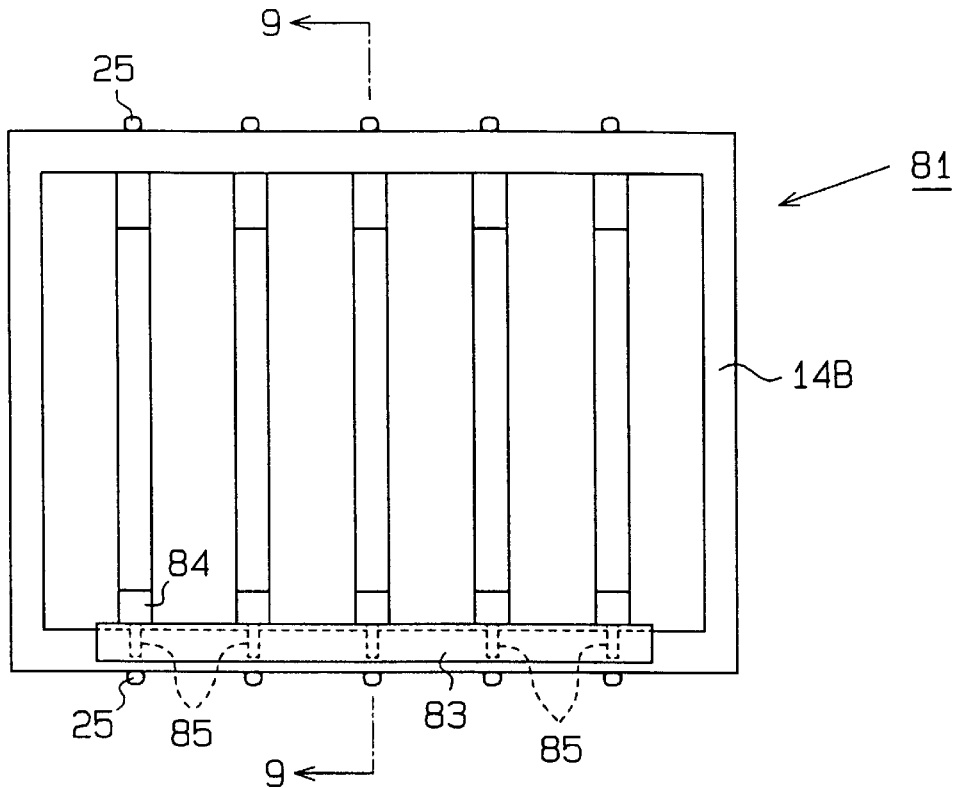
FIG. 8 is a rear view illustrating a transfer register according to a third embodiment.

A transfer register 61 of FIGS. 7 and 8 is different from the transfer register 11 of FIGS. 1 to 5 in the structure for engaging a front duct member 62A with a rear duct member 62B. Also, the location of connector rods 65, 66, which connect front deflector plates 63 and rear deflector plates 64, are different from the locations of the connector rods 23, 27 of the register 11 shown in FIGS. 1 to 5.

Figure 6:
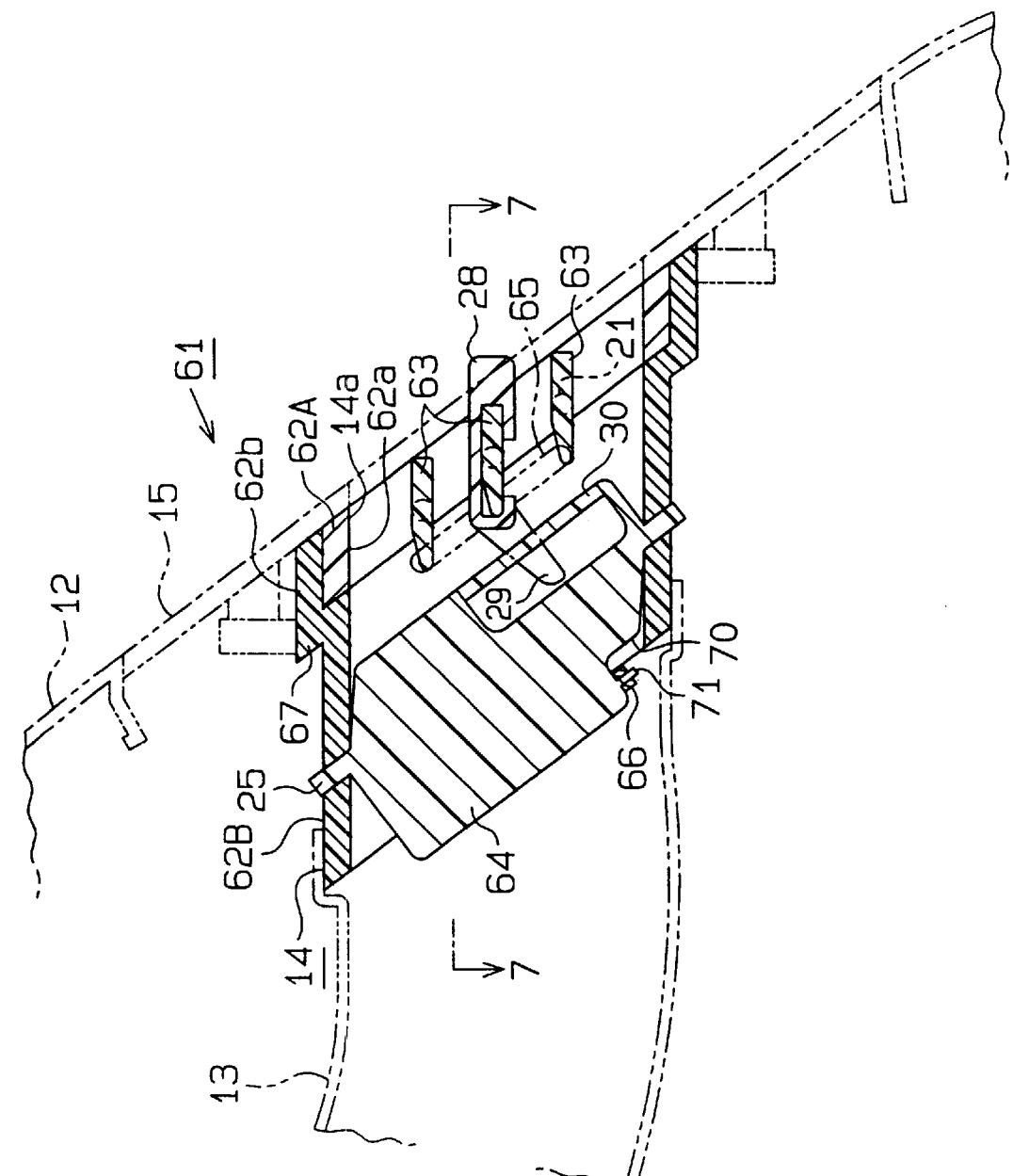
FIG. 6 is a cross-sectional view illustrating a transfer register according to a second embodiment of the present invention.

The front duct member 62A of the embodiment shown in FIGS. 6 and 7 is shorter than that of the embodiment of FIGS. 1 to 5. The rear duct member 62B has a front portion 62b, the cross-sectional area of which is larger than that of the remainder of the rear duct member 62B. A step 67 is defined between the front portion 62b and the remainder. A rear portion of the front duct member 62A is fitted in the front portion 62b of the rear duct member 62B, which secures the front duct member 62A to the rear duct member 62B.

As shown in FIG. 7, each front deflector plate 63 has a front notch 68 at its rear left corner. A front connector pin 69 extends laterally from each front deflector plate 63 in the front notch 68. The front connector pin 69 is parallel to the front support shafts 21 and the distal end of the front connector pin 69 does not extend further outward than the edge of the front deflector plate 63. A connector, which is a front connector rod 65, is coupled to the front connector pins 69. The connector rod 65 is made of the same resin as the front duct member 62A. The connector rod 65 permits the front deflector plates 63 to synchronously pivot. The connector rod 65 is located behind the rear edge of the front duct member 62A and laterally inside the sidewalls of the front duct member 62A. In other words, the connector rod 65 is located inside the duct 14, which is formed by assembling the front duct member 62A and the rear duct member 62B.

The rear-front dimension of each rear deflector plate 64 is greater than that of the rear deflector plates 24 in the embodiment of FIGS. 1 to 5. As shown in FIG. 6, each rear deflector plate 64 has a rear notch 70 at its rear bottom corner. A rear connector pin 71 extends in the rear notch 70 parallel to the rear support shafts 25. The rear connector pins 71 do not extend further downward than the lower edge of the rear deflector plates 64. A connector, which is a rear connector rod 66, is coupled to the rear connector pins 71. The rear connector pins 71 are made of the same resin as the rear duct member 62B. The rear connector rod 66 permits the rear deflector plates 64, the number of which is five in this embodiment, to synchronously pivot. The rear connector rod 66 is located behind the rear edge of the front duct member 62A and inside a plane that extends from the lower wall of the front duct member 62A.

In addition to the advantage a) of the embodiment of FIGS. 1 to 5, the embodiment of FIGS. 6 and 7 has the following advantages.

c) The connector rods 65, 66, which couple the front deflector plates 63 and the rear deflector plates 64, respectively, are located behind the duct members 62A, 62B, respectively. The ends of the rods 65, 66 do not protrude from the duct 14.

Therefore, the sizes of the duct members 62A, 62B can be reduced. Also, since the connector pins 69, 71 and the ends of the connector rods 65, 66 do not protrude from the duct members 62A, 62B, the connector pins 69, 71 and the rods 65, 66 are less likely to be damaged when the transfer register 61 is being carried or assembled.

A third embodiment of the present invention will now be described with reference to FIGS. 8 and 9. The differences from the embodiments of FIGS. 1 to 7 will mainly be discussed below.

Figure 9:
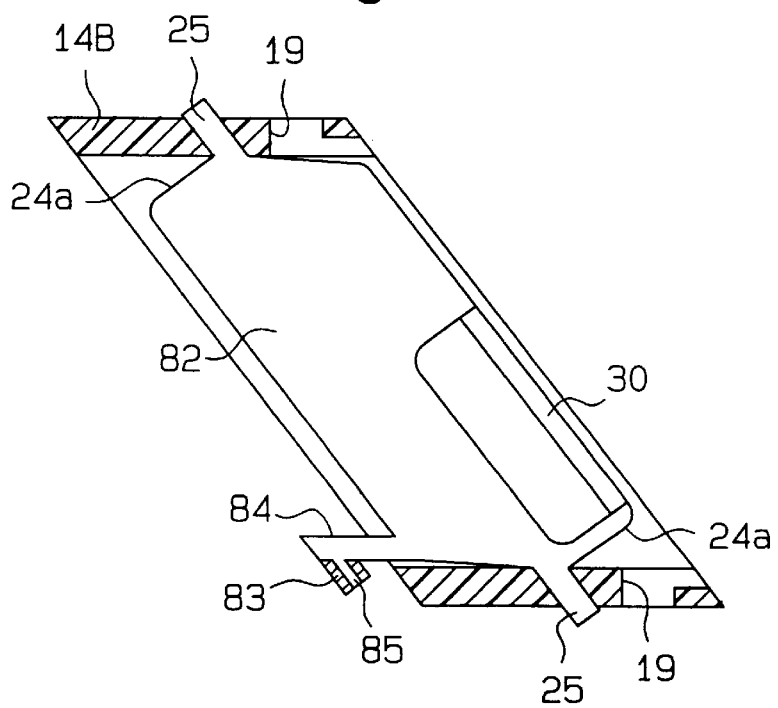
FIG. 9 is a cross-sectional view taken along line 8—8 of FIG. 9.
Figure 10:
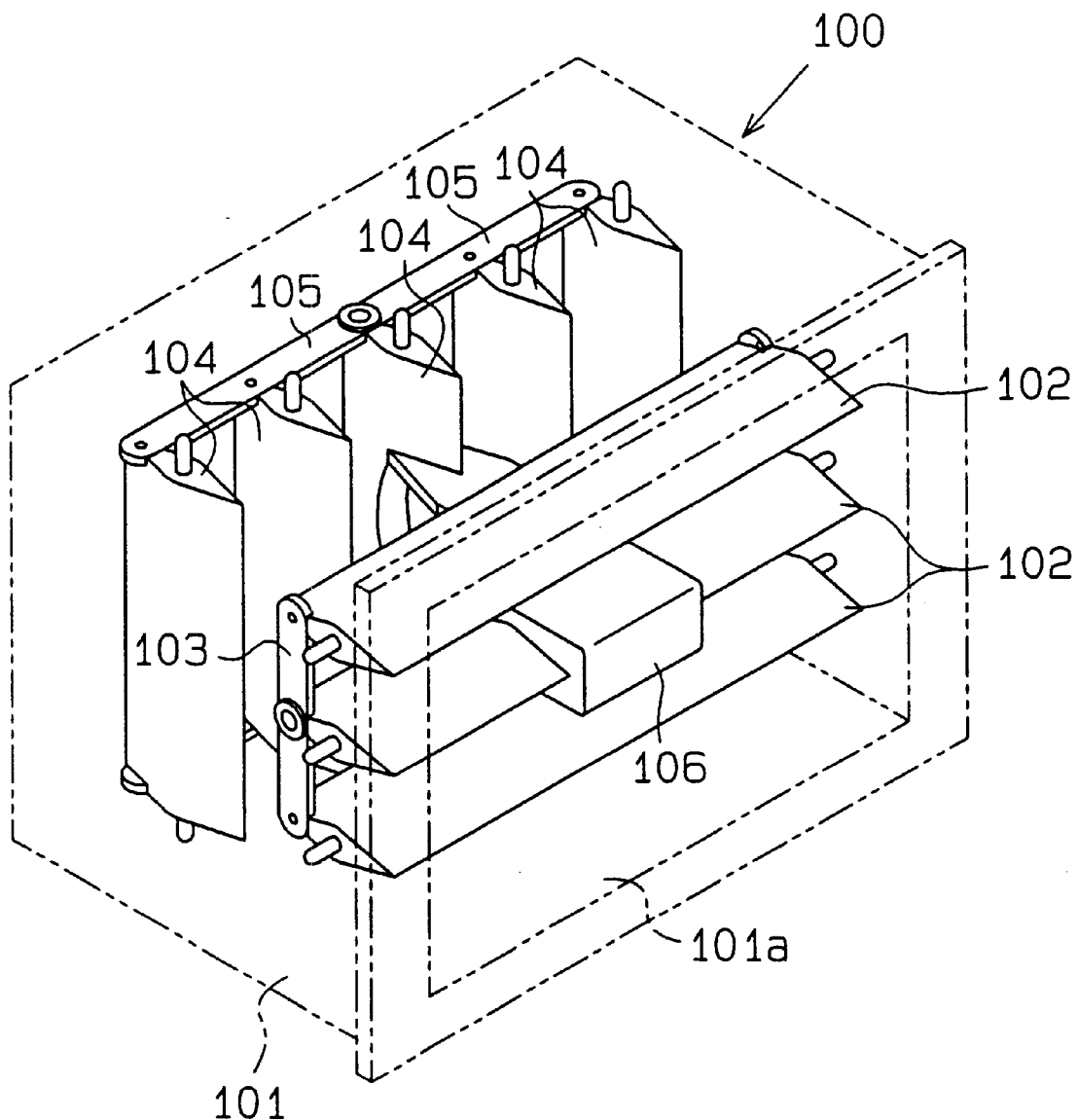
FIG. 10 is a perspective view illustrating a prior art transfer register.

As shown in FIGS. 8 and 9, the location of a rear connector rod 83 for connecting rear deflector plate 82, the number of which is five in this embodiment, is different from that in the embodiments of FIGS. 1 to 7. That is, a rear coupler lever 84 protrudes rearward from each rear deflector plate 82.

As shown in FIG. 9, a connector pin 85 extends from each rear coupler lever 84. The connector pins 85 are parallel to the rear support shafts 25. The rear connector rod 83, which is made of the same resin as the rear duct member 14B, connects the connector pins 85. The rear connector rod 83 permits the rear deflector plates 82 to synchronously pivot. The rod 83 is located in the vicinity of the rear lower corner of the rear duct member 14B.

In addition to the advantage a) of the embodiment shown in FIGS. 1 to 5, the embodiment of FIGS. 8 and 9 has the following advantages.

d) The connector rod 83 is located behind the rear duct member 14B and extends in the vicinity of the lowest portion of the rear duct member 14B.

The connector rod 83 is not located in the path of air in the duct 14. Also, the rod 83 is not located outside a plane extending from the bottom surface of the rear duct member 14B. Therefore, the rod 83 does not disturb the flow of air in the duct 14 and is not damaged by contact with other things.

It should be apparent to those skilled in the art that the present invention may be embodied in many other specific forms without departing from the spirit or scope of the invention. Particularly, it should be understood that the invention may be embodied in the following forms.

The front deflector plates 20, 63 and the rear deflector plates 24, 64 may be arranged in the orientations perpendicular to those of the illustrated embodiment, respectively.

The duct 14 may be formed cylindrically and the opening 14a may be formed circularly.

The opening 14a may be perpendicular to the upper and lower surfaces of the duct 14, and the rear deflector plates 24, 64, 82 may pivot along axes that are parallel to the opening 14a.

In the illustrated embodiment, ABS and PP are used in the first and second steps, respectively. However, other resins may be used as long as a resin used in the first step has a higher melting point than a resin used in the second step and the resins do not adhere to each other.

The present invention may be embodied in a transfer register used in a body panel of vehicles such as vessels and airplanes.

The present examples and embodiments are to be considered as illustrative and not restrictive and the invention is not to be limited to the details given herein, but may be modified within the scope and equivalence of the appended claims.

What is claimed is:

1. A method comprising:
   molding a set of deflector plates in a first mold with a first material;
   removing the deflector plates from the mold;
   placing the deflector plates in a second mold;
   molding a duct to the deflector plates in the second mold using a second material, wherein the first material does not adhere to the second material, wherein the molding includes forming an engaging rim in the duct for connecting the duct to another duct; and
   removing the deflector plates and the duct from the second mold, wherein the deflector plates pivot with respect to the duct when the molding of the duct is finished.

2. The method according to claim 1, wherein the duct is a first duct, the method further including connecting the duct to a second duct by the engaging rim.

3. The method according to claim 2, wherein the deflector plates are a first set of deflector plates, the method further including molding a second set of deflector plates in the second duct, and locating the second set of deflector plates such that the deflector plates of the second set are perpendicular to the deflector plates of the first set.

4. The method according to claim 1, wherein the melting point of the first material is higher than that of the second material.

5. The method according to claim 1, wherein the duct includes a connector, the method further comprising coupling the deflector plates to one another with the connector such that the deflector plates pivot synchronously.

6. The method according to claim 5 further comprising:
   molding the connector outside of the duct; and
   forming the connector with material that is the same as that of the duct.

7. The method according to claim 5, wherein the duct conducts air from a rear end of the duct to a front end of the duct, the method further comprising:
   molding the connector at the rear end of the duct; and
   forming the connector with material that is the same as that of the duct.

8. The method according to claim 7, wherein the forming includes molding the connector inside the duct.

9. The method according to claim 7 further comprising molding the connector such that the connector is located near a lower portion of the duct.

10. A register comprising:
    a first deflector plate;
    a first duct for supporting the first deflector plate such that the first deflector plate pivots with respect to the first duct about an axis;
    a second deflector plate; and
    a second duct, which is separate from the first duct, for supporting the second deflector plate such that the second deflector plate pivots with respect to the second duct about an axis, wherein the axis about which the first deflector plate pivots is perpendicular to the axis about which the second deflector plate pivots, and wherein the first duct is connected to the second duct such that the register is unitary, and wherein the first and the second deflector plates are formed with a first material and the first and the second ducts are formed with a second material, and the melting point of the first material is higher than that of the second material.

11. The register according to claim 10 further including a connector for coupling the first deflector plates to one another such that the first deflector plates pivot synchronously.

12. The register according to claim 10 further including a connector for coupling the second deflector plates to one another such that the second deflector plates pivot synchronously.

* * * * *